United States Patent
Nilsson

(10) Patent No.: US 7,938,462 B2
(45) Date of Patent: May 10, 2011

(54) BUMPER BEAM

(75) Inventor: Johan Nilsson, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 12/451,561

(22) PCT Filed: May 9, 2008

(86) PCT No.: PCT/SE2008/000316
§ 371 (c)(1),
(2), (4) Date: Nov. 18, 2009

(87) PCT Pub. No.: WO2008/147277
PCT Pub. Date: Dec. 4, 2008

(65) Prior Publication Data
US 2010/0102578 A1    Apr. 29, 2010

(30) Foreign Application Priority Data
May 30, 2007 (SE) .................................. 0701297

(51) Int. Cl.
*B60R 19/56* (2006.01)

(52) U.S. Cl. ........................................ 293/102; 293/120

(58) Field of Classification Search ............ 296/102, 296/120
See application file for complete search history.

(56) References Cited

U.S. PATENT DOCUMENTS

| 6,814,381 | B1 * | 11/2004 | Frank | 293/133 |
| 2007/0102942 | A1 * | 5/2007 | Muskos | 293/102 |
| 2007/0176438 | A1 * | 8/2007 | Tornberg | 293/102 |
| 2009/0085362 | A1 * | 4/2009 | Terada et al. | 293/132 |
| 2010/0148526 | A1 * | 6/2010 | Karlander | 293/155 |

FOREIGN PATENT DOCUMENTS

| DE | 10327008 B3 | 1/2005 |
| WO | WO 99/20490 A1 | 4/1999 |
| WO | WO 02/38418 A1 | 5/2002 |
| WO | WO 2005/054011 A1 | 6/2005 |

* cited by examiner

*Primary Examiner* — Joseph D Pape
(74) *Attorney, Agent, or Firm* — Mark P. Stone

(57) ABSTRACT

A bumper beam for a vehicle has a hat shaped profile with the crown (12-14) facing the vehicle and has a cover (17) that gives the bumper beam a closed profile. The bumper beam has two mountings (20, 21) that usually are adapted to be fitted to the side rails of the vehicle. The cover is extended on both sides past the mountings, but leaves the outer portions of the hat beam open. The crown of the open portions of the hat beam have a longitudinal indentation (32) and a profile height that decreases towards the ends.

1 Claim, 4 Drawing Sheets

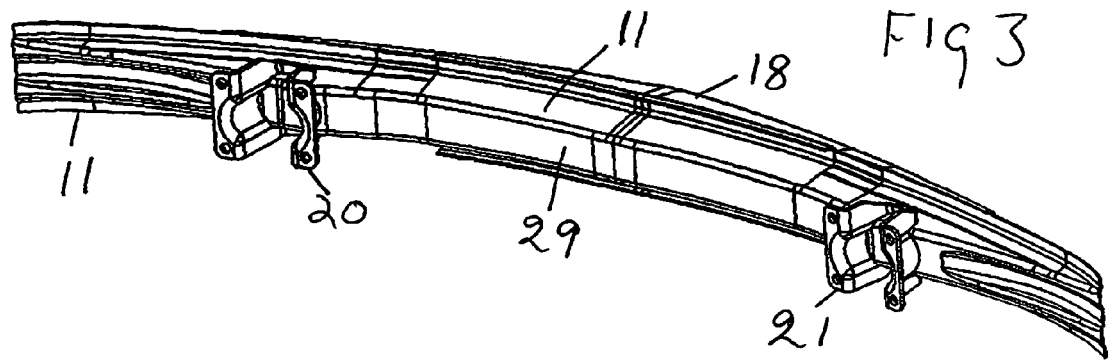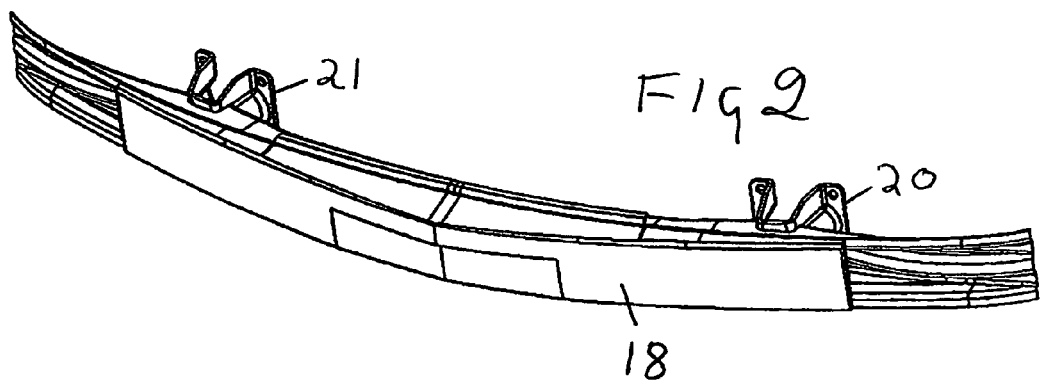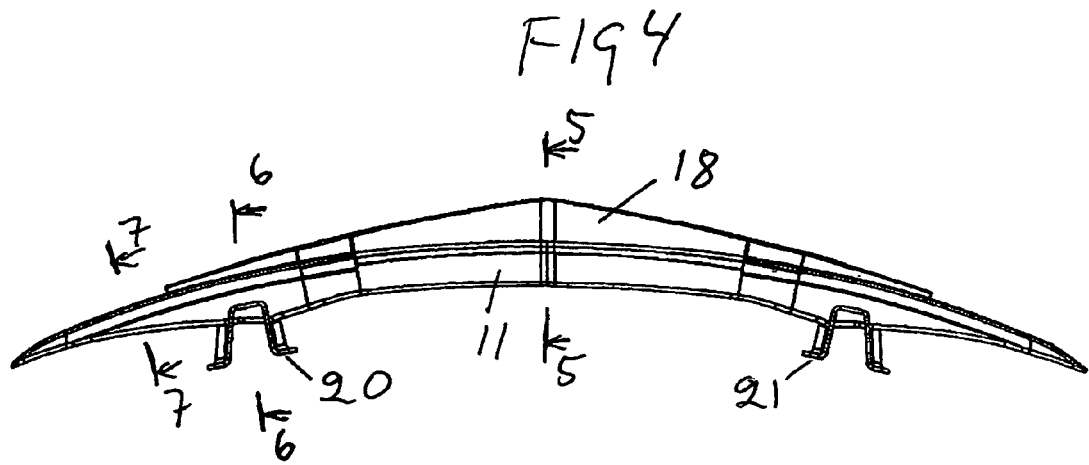

BUMPER BEAM

FIELD OF THE INVENTION

The present invention relates to a bumper beam for vehicles, comprising a hat beam with a crown and side flanges, wherein the side flanges, at their ends, have mountings for attaching to the vehicle, the crown faces the vehicle, and a cover is welded to the side flanges in order to give the bumper beam a closed profile.

OBJECTS OF THE INVENTION AND BRIEF DESCRIPTION OF THE INVENTION

It is an object of the invention is to provide a sturdy bumper with low weight that leaves a lot of space for the design of the vehicle. This is achieved when the cover extends past the mountings, but leaves the outer portions of the hat beam open, and the crown on the open portions of the hat beam has a longitudinal indentation and a profile height that diminishes towards the ends.

SHORT DESCRIPTION OF THE DRAWINGS THAT SHOW AN EMBODIMENT THE INVENTION

FIG. 1 shows as an example of the invention, a bumper beam with mountings. The beam is shown in perspective obliquely towards the vehicle.

FIG. 2 corresponds to FIG. 1, but shows the beam fitted with an energy-absorbing foam body.

FIG. 3 shows the same beam obliquely from the outside and it is shown with the energy-absorbing foam body.

FIG. 4 is a top view of the beam with the foam body.

DETAILED DESCRIPTION OF THE SHOWN AND PREFERRED EMBODIMENT

Figure 1:
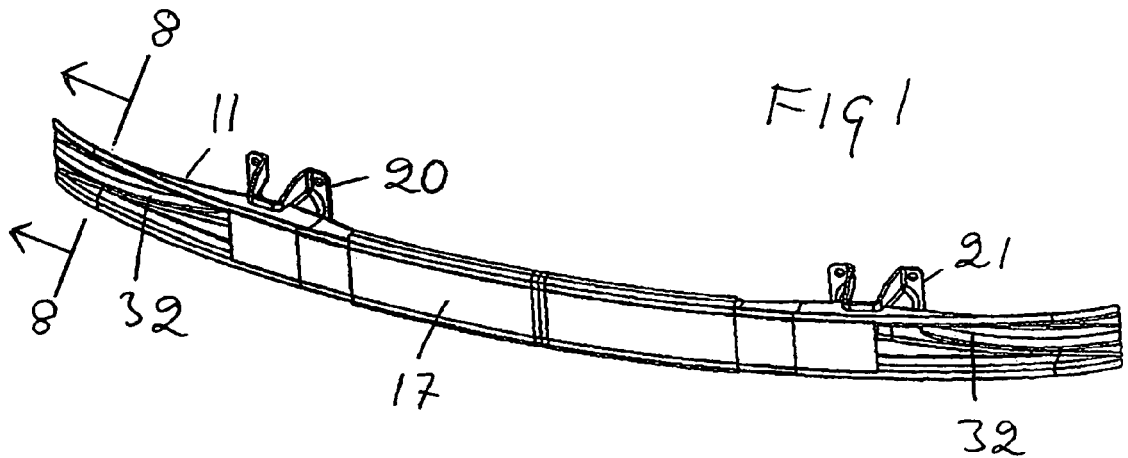

The bumper beam consists of a hat beam 11, and a cover 17. The hat beam consists of a central flange 12, i.e. the bottom of the profile, and two webs 13, 14, i.e. an upper and a lower side. The webs end with the side flanges 15, 16 of the hat profile. The central flange and the webs constitute the crown of the hat beam. The cover 17 is welded to the side flanges of the central part of the beam, and an energy absorbent body 18, e.g. an EPP foam body, is glued to the cover. The cover gives the beam a closed profile, but leaves the ends open.

At the ends of the beam are two mountings 20, 21, with which it may be fitted to structural parts of the vehicle, usually to the two side rails of the vehicle. These mountings have the shape of short, standing beams with hat profiles with a central flange 22, two webs 23, 24 and side flanges 25, 26. The central flange and web of a mounting form a crown which has a cut-out 27 that is adapted to the bumper beam and is welded to the bumper beam with line welds both along the two webs of the bumper beam and along its central flange. The mounting may be stiffened by bending the webs as is shown. The sides flanges 25, 26 of the mountings 20, 21, have holes 28 for fixing with bolts on to the vehicle. The webs 23, 24 will thus give support with standing plates both against the bottom and the top sides of the beam 11, and will therefore provide great resistance to any twisting of the beam. In case of collisions that strike vertically above or below the centerline of the beam, the loads of the collision will impart a torque on the beam that will effectively be counteracted by the mountings.

Figure 7:
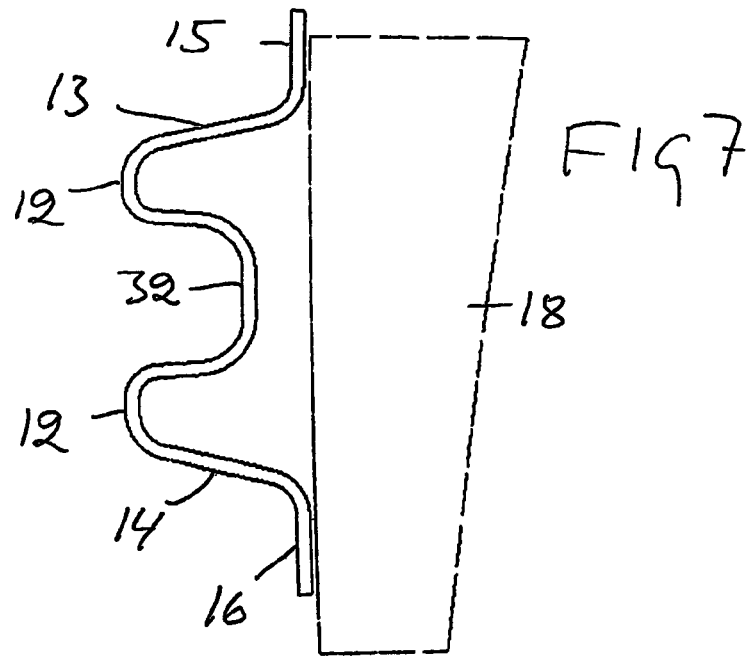
FIG. 7 is a cross section indicated with the line 7-7 in FIG. 4.

The hat beam 11 has a varied hat profile along its length. The profile height is at its tallest at the mountings and on a middle section 29, the edges of the side flanges are turned up into bends 30, 31. At the mountings where the profile is high, the side flanges have no bent edges. On both sides outside the mountings 20, 21, the central flange has an indentation 32, whose depth gradually decreases towards the ends so that the depth of the profile lessens. The cover 17 covers the mountings 20, 21, but not the ends outside the mountings, and the foam body 18 may end where the cover 17 ends such as is shown in FIGS. 2 and 4. Alternatively, the foam body can also cover the illustrated open portions of the beam 11 as is shown with the broken lines on FIGS. 7 and 8, or the foam body may be omitted.

Figure 9:
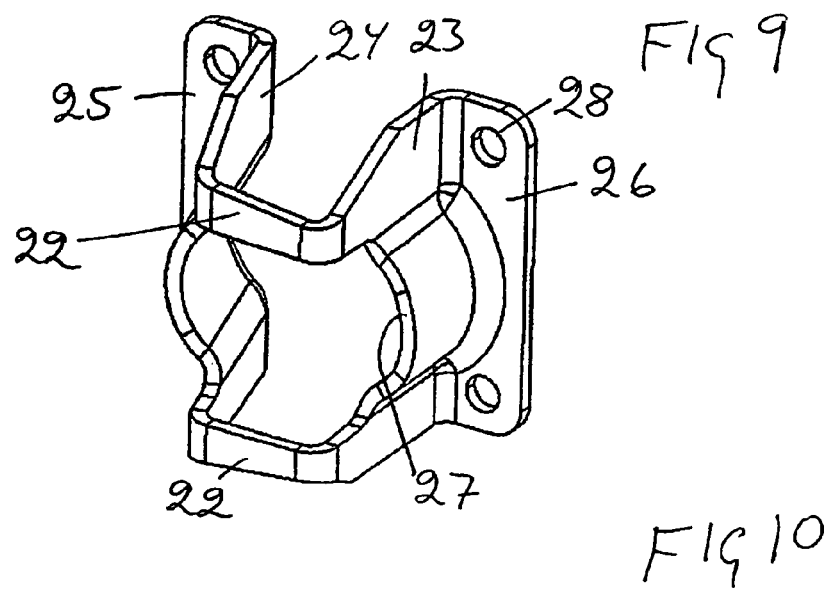
FIG. 9 is a perspective view of one of the two mountings that are shown on the other figures.
Figure 10:
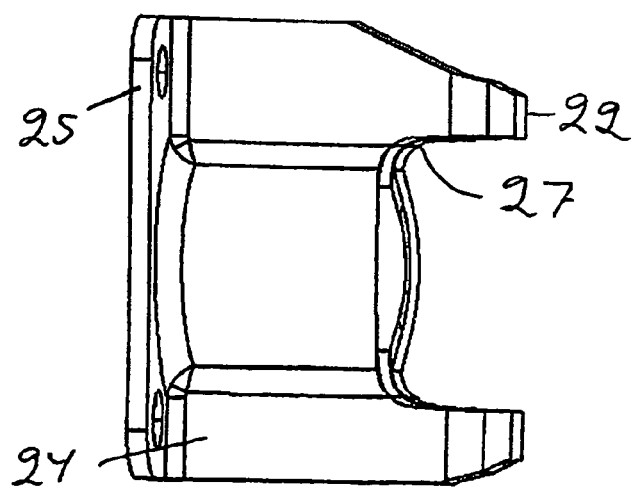
FIG. 10 is a side view of the mounting as shown in FIG. 9.
Figure 5:
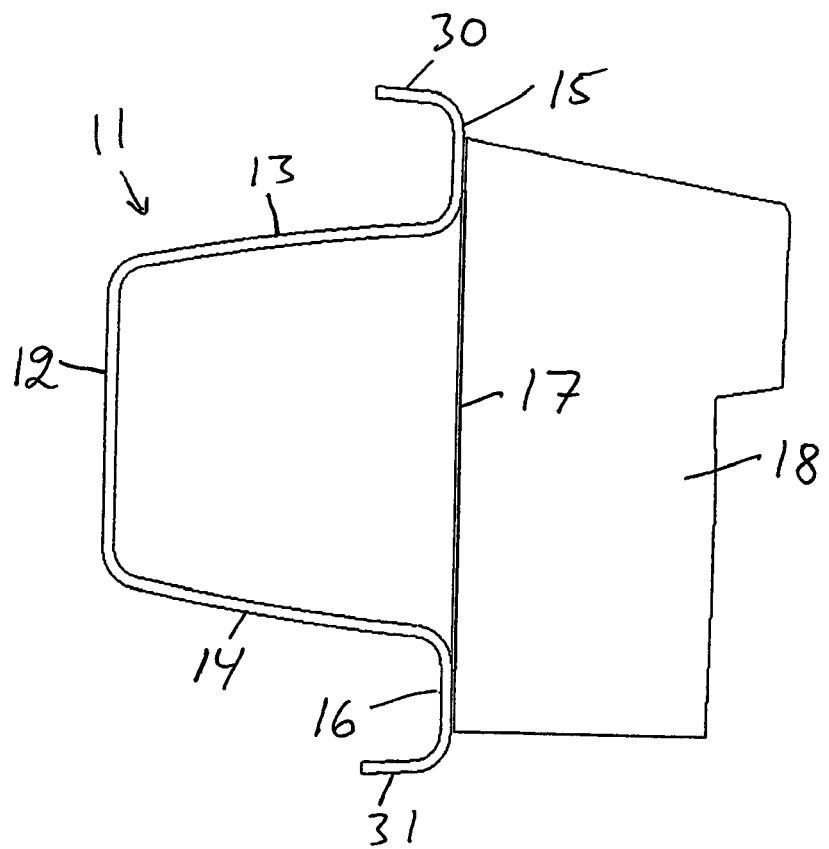
FIG. 5 is a cross section indicated with the line 5-5 in FIG. 4.
Figure 6:
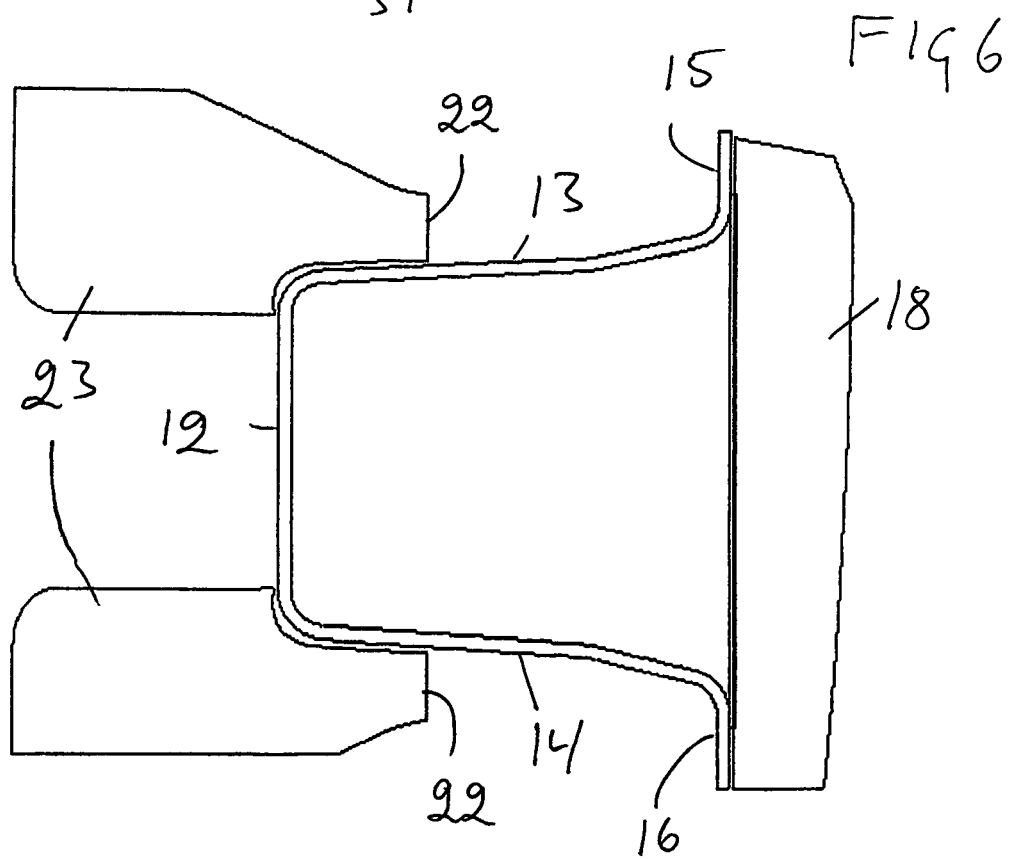
FIG. 6 is a cross section indicated with the line 6-6 in FIG. 4.
Figure 8:
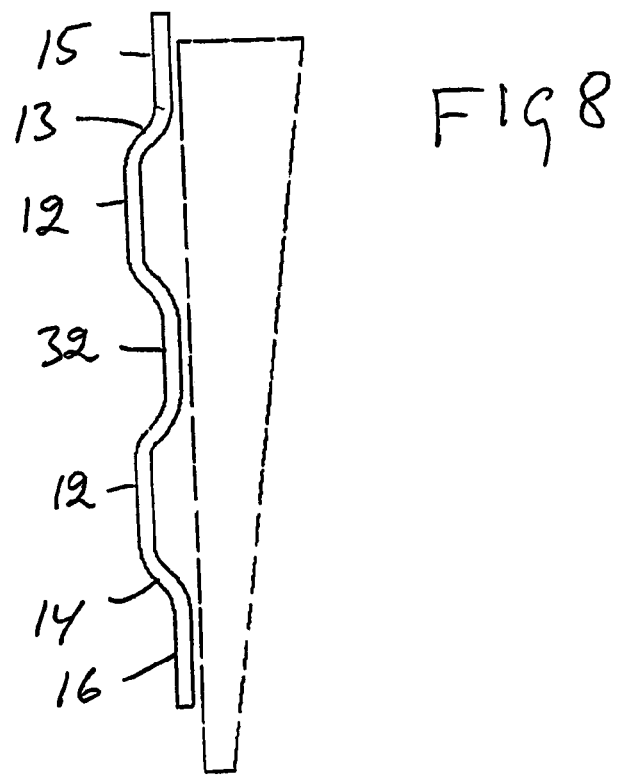
FIG. 8 is an end view as indicated with the arrows 8 in FIG. 1.

The part of the bumper that is between the mountings 20, 21 is very strong because it has a closed comparatively high profile, i.e. a high profile in the horizontal plane. Outside the mountings, the height of the profile gradually decreases as is shown in FIGS. 8 and 9, but the indentation 32 gives the result that the strength does not decrease so quickly towards the ends even though the height of the profile decreases. The bumper beam according to this invention is not only to be used with the mountings shown, but can also be used for example with longer crash boxes.

The bumper beam shown is primarily aimed at being used as a front bumper, but the invention may also be used for a rear bumper.

The invention claimed is:

1. A bumper beam for vehicles, comprising a hat beam with a crown formed from a central flange (12) and two webs (13, 14), and side flanges (15, 16) extending from the webs, wherein mountings are attached to the hat beam for mounting the hat beam to a vehicle, said hat beam and said mountings being arranged such that said crown faces towards a vehicle to which said hat beam is attached, and a cover (17) welded to the side flanges to provide the bumper beam with a closed profile, characterised in that the cover (17) extends past the mountings, but leaves open portions of the hat beam proximate to the ends thereof, and the crown at the open portions of the hat beam has a longitudinal indentation (32) defining a profile height that diminishes towards the ends of the hat beam.

* * * * *